US008572743B2

(12) United States Patent
Di Crescenzo et al.

(10) Patent No.: US 8,572,743 B2
(45) Date of Patent: Oct. 29, 2013

(54) VIRUS LOCALIZATION USING CRYPTOGRAPHIC HASHING

(75) Inventors: Giovanni Di Crescenzo, Madison, NJ (US); Faramak Vakil, Long Grove, IL (US)

(73) Assignee: TTI Inventions C LLC, Wilmington, DE (US)

(*) Notice: Subject to any disclaimer, the term of this patent is extended or adjusted under 35 U.S.C. 154(b) by 0 days.

(21) Appl. No.: 13/408,728

(22) Filed: Feb. 29, 2012

(65) Prior Publication Data

US 2012/0159181 A1    Jun. 21, 2012

Related U.S. Application Data

(62) Division of application No. 11/978,773, filed on Oct. 30, 2007, now Pat. No. 8,191,146.

(60) Provisional application No. 60/855,710, filed on Oct. 31, 2006.

(51) Int. Cl.
*H04L 29/14* (2006.01)

(52) U.S. Cl.
USPC ............................. 726/24; 713/187; 713/188

(58) Field of Classification Search
None
See application file for complete search history.

(56) References Cited

U.S. PATENT DOCUMENTS

| | | | |
|---|---|---|---|
| 5,349,655 A | 9/1994 | Mann | |
| 5,485,575 A | 1/1996 | Chess et al. | |
| 5,613,002 A | 3/1997 | Kephart et al. | |
| 7,234,167 B2 | 6/2007 | Teblyashkin et al. | |
| 7,373,519 B1 | 5/2008 | Nachenberg et al. | |
| 7,752,669 B2 | 7/2010 | Palliyil et al. | |
| 2004/0117623 A1 | 6/2004 | Kalogridis et al. | |
| 2004/0143713 A1 | 7/2004 | Niles et al. | |
| 2004/0172551 A1 | 9/2004 | Fielding et al. | |

FOREIGN PATENT DOCUMENTS

WO      2005050441 A1     6/2005

OTHER PUBLICATIONS

F. Cohen, "Computer Viruses—Theory and Experiments", Computers and Security, vol. 6, 1987; 14 pages.
F. Cohen, "On the Implications of Computer Viruses and Methods of Defense", Computers and Security, vol. 7, n. 2, 1988; 22 pages.
Kim et al., "The Design and Implementation of Tripwire: A File System Integrity Checker," ACM Conference on Computer and Communications Security; 1994; pp. 1-18.
CERT Advisory CA-1992-02 Michelangelo PC Virus Warning, http://www.cert.org/advisories/CA-1992-02.html. 1997; 2 pages.

(Continued)

*Primary Examiner* — Minh Dinh
(74) *Attorney, Agent, or Firm* — Fitch, Even, Tabin & Flannery LLP

(57) ABSTRACT

Methods for using integrity checking techniques to identify and locate computer viruses are provided. A method for virus localization for each of three types of virus infections is provided, including the steps of computing a sequence of file blocks, calculating hashes for the sequences of file blocks from a host file and calculating hashes for the same or related sequences of file blocks from an infected file, and comparing the hashes from host file to the hashes from the infected file from the same or related sequences of file blocks such that when some of said first hashes and said second hashes do not match, a location of a virus is output. Methods for computing the sequence of file blocks depending on the type of virus infection, and for calculating the hashes using a collision resistant hash function, a digital signature scheme, a message authentication code, or a pseudo-random function.

18 Claims, 9 Drawing Sheets

(56) References Cited

OTHER PUBLICATIONS

CERT Advisory CA-1999-04 Melissa Macro Virus, http://www.cert.org/advisories/CA-1999-04.html, 1999; 4 pages.
A. Tridgell, "Efficient Algorithms for Sorting and Synchronization", http://samba.org/tridge/phd_thesis.pdf; Jul. 1999; 115 pages.
CERT Advisory CA-2001-26 Nimda Worm, http://www.cert.org/advisories/CA-2001-26.html, 2001, 6 pages.
Quinlan et al., "Venti: A New Approach to Archival Storage," in Proc. USENIX Conference on File and Storage Technologies (FAST); Jan. 2002; pp. 89-101.
E. Skoudis, "MALWARE: Fighting Malicious Code", Prentice Hall, 2004, 25 pages.
P. Szor, "The Art of Computer Virus Research and Defense", Addison Wesley, 2005, 86 pages.
Di Crescenzo et al., "Towards a Theory of Intrusion Detection," ESORICS 2005, LNCS 3679; 2005; pp. 267-286.
1st NIST Cryptographic Hash Functions Workshop, Program at http://www.csrc.nist.gov/pki/HashWorkshop/2005/program.htm; 2005; 13 pages.
PCT Search Report from related application PCT/US07/22899; Jun. 5, 2008; 2 pages.
Di Felice, M.; Examiner; Extended European Search Report from related European Patent Application No. 07867310.0 dated Aug. 23, 2013; 7 pages.

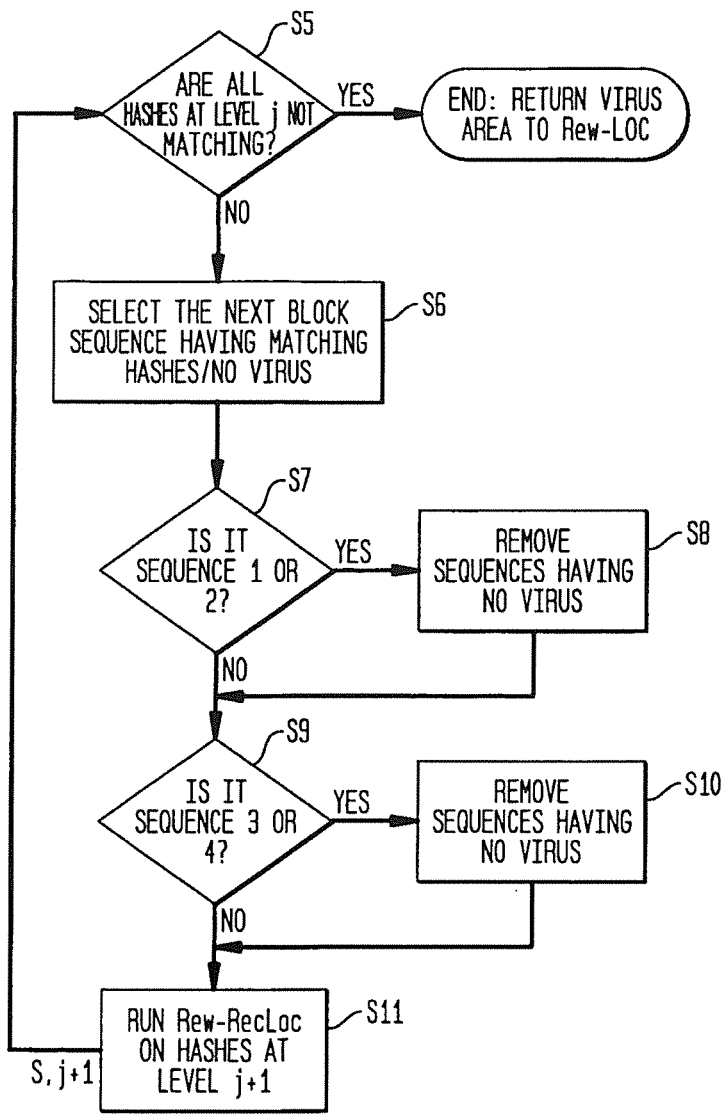

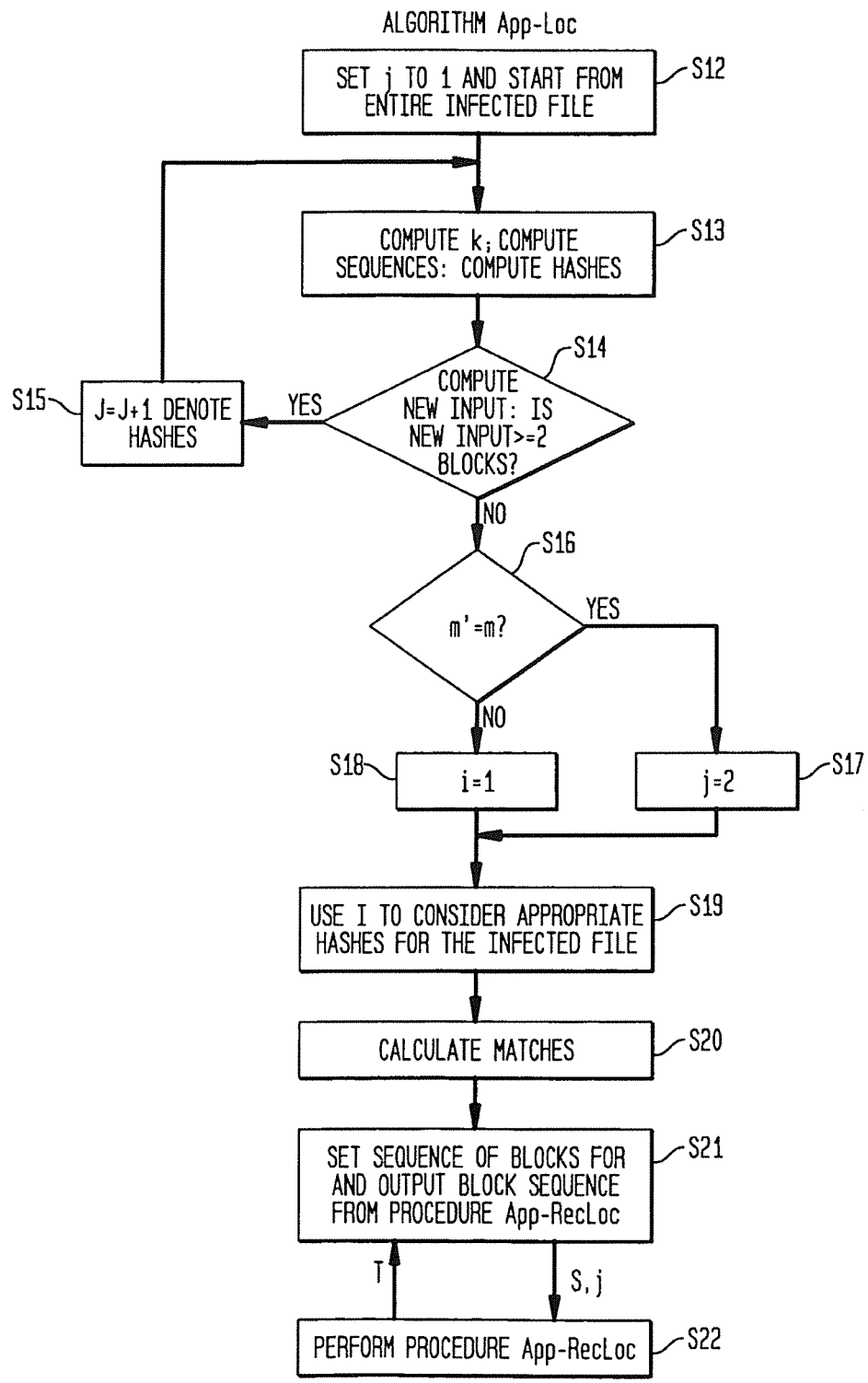

ALGORITHM App-RecLoc

FIG. 9

APPLICABILITY OF OUR TECHNIQUES

| CONSTRUCTION NAME | INFECTION TECHNIQUE | VIRUS LENGTH $x$ RESTRICTION |
|---|---|---|
| DETECTION | ANY | NONE |
| TRIVIAL | ANY | NONE |
| Rew - pH | REWRITING | $x < n/4$ |
| App - pH | APPENDING | $x \leq n$ |
| Emb - pH | EMBEDDING | $x \leq n$ |

FIG. 10

PERFORMANCE OF OUR TECHNIQUES

| CONSTRUCTION NAME | LOCALIZING FACTOR | EXPANSION FACTOR | TIME BLOWUP |
|---|---|---|---|
| DETECTION | $n$ | 1 | 1 |
| TRIVIAL | 1 | $n$ | 1 |
| Rew - pH | 2 | $4 \log n$ | $4 \log n$ |
| App - pH | 2 | $\log n$ | $\log n$ |
| Emb - pH | 2 | $8 \log n$ | $8 \log n$ |

VIRUS LOCALIZATION USING CRYPTOGRAPHIC HASHING

CROSS REFERENCE TO RELATED APPLICATIONS

This application is a divisional of U.S. patent application Ser. No. 11/978,773, filed Oct. 30, 2007, now U.S. Pat. No. 8,191,146 which claims the benefit of U.S. provisional patent application 60/855,710 filed Oct. 31, 2006, which are hereby incorporated by reference in their entirety herein. This application is also related to U.S. patent application Ser. No. 13/408,690, filed Feb. 29, 2012, titled VIRUS LOCALIZATION USING CRYPTOGRAPHIC HASHING, which is incorporated by reference herein and is filed on even date as this application.

FIELD OF THE INVENTION

The present invention relates generally to software security, and more specifically to methods for using integrity checking techniques to identify and locate computer viruses.

BACKGROUND OF THE INVENTION

Virus detection is a problem of surprisingly wide impact on any computer user who is routinely asked to take preventative measures against viruses, such as buying and running antivirus software. A virus is a data in the form of text, executable code, etc., that is added to or overwrites data in a user's file without the user's authorization, and generally without the user's knowledge. Research in the area of virus detection includes various heuristic approaches targeting specific classes of viruses. Some of the most successful modern techniques attempting to solve this problem fall into the general paradigms of signature detection and integrity checking, e.g. E. Skoudis, "MALWARE: Fighting Malicious Code", Prentice Hall (2004), and P. Szor, "The Art of Computer Virus Research and Defense", Addison Wesley (2005). The former paradigm requires discovering pieces of infected code, called signatures, for known viruses, storing the signatures, and developing software that scans the computer memory to search for such signatures. The latter paradigm, on which this invention focuses, requires using cryptographic hash functions that detect unauthorized changes to a file, and potentially reveal the presence of unknown viruses. An important example of the success of the latter paradigm is Tripwire, a widely available integrity checking program for the UNIX environment.

Intrusion detection principles of signature and anomaly detection, as discussed for example in G. Di Crescenzo, A. Ghosh, and R. Talpade, "Towards a Theory of Intrusion Detection" also supply insight into virus detection methodology. The signature virus detection paradigm is similar to the signature detection principle in the intrusion detection area; the integrity checking paradigm, by contrast, is more similar to the anomaly detection principle in the intrusion detection area.

Available antivirus software typically uses three main techniques for detecting viruses: signatures, heuristics, and integrity verification. The signature technique is similar to the signature detection approach in intrusion detection systems. First, known viruses are studied and signatures of them are stored; then occurrences of these signatures are looked for in candidate executable files. Although this is the most popular approach for virus detection, it relies on quick update of the signature database by vendors and of their signature files by users, and it is easily defeated by polymorphic and metamorphic virus techniques.

The other two techniques, heuristics and integrity verification, are more similar to the anomaly detection approach in intrusion detection systems. Heuristic techniques may be somewhat sophisticated in that they attempt to identify viruses based on some behaviors that they are likely to exhibit, such as attempts to write into executable files, to access boot sectors, to delete hard drive contents, etc. Integrity verification techniques try to detect unexpected modifications to files after the infection has happened, but potentially before the execution of the infected file occurs, thus still making the infection harmless.

While both heuristics and integrity verification techniques have the potential of catching more intelligent viruses, such as those equipped with polymorphism and metamorphism capabilities, the techniques are at most able to raise an alert on a particular file, which later has to be carefully emulated and analyzed in the virus diagnosis phase under a controlled environment where a conclusion about the location, nature and consequences of the potential virus need to be derived. Due to the difficulty of the realization of an accurate controlled environment for emulation, the accuracy of the derived consequences may not be trustworthy. Moreover, in many cases, the modification carried by the virus to the original file is very minimal, e.g., a subroutine call to a program located somewhere else in memory, and therefore it would be very helpful to have additional information about the virus itself.

Further, the integrity verification technique or integrity checking principle only detects changes to the file, but does not localize or indicate where, within the file, the changes occur. Absent localization information about the virus, its detection is very resource-expensive and failure-prone. This implicitly defines a new problem in the area of software security, "virus localization".

The problem of virus localization has never been rigorously investigated or even posed before, as far as the inventors know. Applying cryptographic hashing to the data is a well-known paradigm for data integrity verification, and is fundamental for programs that verify the integrity of file systems, like Tripwire. Cryptographic hashing of all atomic blocks of a file is also a known paradigm, and has been used for programs that remotely update files over high latency, low bandwidth link, or address write-once archival data storage purposes. However, none of these programs solves the virus localization problem.

BRIEF SUMMARY OF THE INVENTION

The present invention advantageously provides a method for virus localization for each of three types of virus infections. In one embodiment, the method comprising the steps of calculating hashes for sequences of blocks from a host file, partitioning a suspected or corrupted file into a plurality of groups, each group comprising a plurality of sequences of blocks, calculating hashes for all of the plurality of sequences of blocks in the suspected file, and comparing the hashes from the host file to the hashes from the suspected, so that if no mismatch is found, the suspected file is declared "uncorrupted", while if at least one mismatch is found, the suspected file is declared "corrupted", and the approximate location of a virus within the file is determined.

The method for virus localization can include the steps of computing a sequence of file blocks, calculating hashes for the sequences of file blocks from a host file and calculating hashes for the same or related sequences of file blocks from an infected file, and comparing the hashes from host file to the hashes from the infected file from the same or related sequences of file blocks such that when some of said first hashes and said second hashes do not match, a location of a virus is output. Methods are provided for computing the sequence of file blocks depending on the type of virus infection, and for calculating the hashes using a collision resistant hash function, a digital signature scheme, a message authentication code, or a pseudo-random function.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 4b shows the steps in algorithm Rew-RecLoc (used by Rew-Loc);

FIG. 6a shows the steps in the appending-virus localization algorithm App-Loc;

FIG. 9 is a summary of properties of various virus localization techniques; and

FIG. 10 is a performance evaluation of various virus localization techniques.

DETAILED DESCRIPTION OF THE INVENTION

Figure 1:
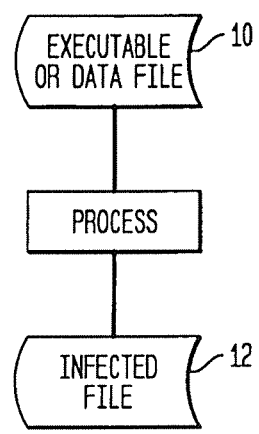
FIG. 1 is a schematic diagram.

A method to improve software security using virus localization is presented. The integrity checking principle described above can be extended so that not only are changes to the file are detected, but also these changes are localized within the file.

Methods for achieving virus localization can be designed for each infection technique, such as rewriting techniques, appending and prepending techniques, and each insertion or embedding technique. The inventive methods are based on repeated efficient applications of cryptographic hashing to various sequences of the set of file blocks, chosen according to codes that are specific to the infection technique. In all cases, the methods achieve satisfactory localization, that is, an area at most twice as large as the virus is identified in the corrupted file, and efficiency, that is, the hashes returned by the localizing hash functions are longer that those returned by a conventional cryptographic hash function by at most a logarithmic factor. Output efficiency is a crucial property of a localizing hash function, as there is a trivial construction, discussed below, that returns much longer hashes, i.e., by a factor linear in the number of atomic blocks of the input document.

Viruses that perform certain modifications to a target file, resulting in a corrupted file, where the type of modifications may vary according to specific infection techniques, are examined below. Known notion and formal definition of (cryptographic) collision-resistant hashing, e.g. B. Schneier, "Applied Cryptography: Protocols, Algorithms and Source Code in C", J. Wiley & Sons (1993) are presented, and a classification of virus behaviors is described.

Collision-Resistant Hashing Notion

Mathematical tools often used in cryptography, known as "collision-intractable" hash functions, or "collision-free", "collision-resistant", and sometimes "cryptographic" functions, are very often used for several applications, including those requiring integrity verification of files, messages, etc. These tools or functions are defined as follows: they take as input a binary string of arbitrary length (representing the file to be compressed), and return a fixed-size (e.g., 128- or 160-bit) binary string as output (representing the hash or fingerprint of the original file). When the input to the hash function is much longer than 160 bit, the number of preimages of any single output of the hash function is very large. Yet, the amazing property expected by these functions is that it seems computationally intractable for any efficient algorithm to find even just two preimages that map to the same output, in the sense that any algorithm would have to take infeasible time (e.g., a few centuries or more) to succeed in doing that.

Formal Definition of Collision-Resistant Hash Function

Let k be a security parameter and let $H=\{H_w\}_{w\in N}$ be a family of functions $H_w:\{0,1\}^k \times \{0,1\}^a \rightarrow \{0,1\}^b$, where a>b and w is a function index satisfying |w|=k. We say that H is a collision-resistant hash function family if:

(1) there exists a probabilistic polynomial time (in k) algorithm computing $H_w$ for each w;

(2) for any probabilistic polynomial-time algorithm A, there exists a negligible function $\epsilon$ such that, when w is uniformly chosen, the probability that $A(w)=(x_1,x_2)$ such that $H_w(x_1)=H_w(x_2)$ is at most $\epsilon(k)$.

The following property of collision-resistant hash functions is recognized: except with negligible probability, $H_w(x_1) \neq H_w(x_2)$ when $x_1 \neq x_2$, for $|x_1| \geq k$ and $|x_2| \geq k$, if $x_1$ and $x_2$ are computed from a polynomial-time algorithm. Constructions of composed collision-resistant hash functions that make repeated applications of an atomic collision-resistant hash function over their input can be designed, so that the resulting output of the composed function based on any two inputs reveals information about the inputs' similarity and/or difference.

Classification of Virus Behaviors: Overwriting, Prepending, Appending, Embedded:

Most Internet viruses can be characterized to follow one of these infection techniques: Overwriting, Prepending, Appending and Embedding, which are describe in detail as follows.

Overwriting Infection Technique

In this infection technique, the virus infects a host or target executable file by replacing portion of the host's code. One way that this can be achieved is for the virus to simply open the target file for writing as it would open a regular data file, and then save a copy of itself to the file, resulting in a corrupted file. When the corrupted executable file is later launched by its owner, the operating system will execute the virus code instead of the original target program. This infection technique typically damages the target file, making it not usable.

Prepending Infection Technique

In this infection technique, the virus inserts its code at the beginning of the host or target executable file that the virus desires to infect, creating a corrupted executable file. This technique is generally more elaborate than the overwriting technique, and has been used, for example, by the virus Nimda. When the corrupted file is later launched by its owner, the operating system will first execute the virus code, since it is located at the beginning of the executable, and then the intended, i.e. original target, program. This infection technique not only may not appear to damage the target file, but may also have effects that are not easily detectable by the code's owner. In fact, the presence of such a virus may not be easy to detect.

Appending Infection Technique

In this infection technique, the virus inserts its code at the end of the host or target executable file that the virus desires to infect, and, typically, also inserts a jump to the beginning of the virus code at the beginning of the infected or corrupted file. When the corrupted executable file is later launched by its owner, the operating system will jump to execute the virus code first and then return control to the intended, i.e. original target, program. As with the prepending technique, the presence of a virus using this infection technique may be not easy to detect. This technique was used, for instance, by the virus Michelangelo.

Embedding Infection Technique

In this infection technique, the virus inserts a piece of code or a command pointing to code in a separate file anywhere into a shell script, a Perl script, a Java class file or source code of a file or files that will eventually be compiled into regular executables. Although few examples have been seen of this approach, they serve as a reminder that every program containing executable instructions is a potential target for a virus.

Integrity Verification Based on Cryptographic Hashing

As mentioned above, the integrity verification techniques attempt to detect unexpected modification to a file, before executing it. Integrity verification based on cryptographic hashing can be performed as follows.

Given any collision-resistant hash function family $H=\{H_w\}_{k \in N}$ (for simplicity of notation, we will drop the index w from $H_w$), and a file f, the 160-bit value hash=H(f) gives evidence that any efficient algorithm (possibly creating f itself) would not be able to obtain in feasible computation time, or to already have, a g different from f meeting the integrity verification test H(g)=H(f).

Integrity verification of executable or source files is done as follows. In a preliminary stage, when the file f is believed to be free of infection, such as when the file is downloaded from its original source, a tag hash=H(f) is attached to the file. Later, when a legal modification on the file is performed resulting in file f', a new value hash'=H(f') replaces the previous hash value. When the file needs to be executed, or compiled for execution, the integrity verification test is performed on the current version f' of the file, that is, one checks whether hash'=H(f'). If the match is verified, then we have evidence that only legal modifications have been made to the file; otherwise, some unexpected modification has occurred. As this modification can be caused by an infection, the file is then sent to an analyzer that tries various diagnosis techniques, including emulating the execution of the file in a safe environment, to derive useful information about the virus and to possibly restore the file f to its previous, uninfected, state.

Popular systems using cryptographic hashing for integrity verification include Venti, as from S. Quinlan and S. Dorward, Venti: a New Approach to Archival Storage, in Proc. of USENIX Conference on File and Storage Technologies (FAST), 2002, and G. H. Kim and E. H. Spafford, The Design and Implementation of Tripwire: a File System Integrity Checker, in Proc. of $2^{nd}$ ACM Conference on Computer and Communications Security (ACM CCS), 1994.

Cryptographic Hashing and Virus Localization

The above technique can be extended to check not only for integrity, but also to reveal additional information about the difference between the two files. The basic property of the above integrity verification technique can be rephrased as follows. Given files M(1) and M(2), and their hashes hash(1), and hash(2), there exists an efficient algorithm DIFF that decides the function p(M(1),M(2)), defined as equal to 1 if M(1)=M(2) and 0 otherwise. Algorithm DIFF, using input p, hash(1), and hash(2), simply checks whether hash(1)=hash(2) and returns 1 if yes, or 0 otherwise. This approach can be generalized to broader functions, in particular, to functions detecting information about differences between M(1) and M(2) that are caused by the above-described infection techniques, e.g., rewriting, appending, prepending and embedding infection techniques. For example, p-revealing collision-resistant hash functions are formally defined as collision-resistant hash functions such that for any efficient adversary returning two files M(1),M(2), there exists an efficient algorithm Det that, upon receiving as input the two hashes of M(1) and M(2), is able to compute the function p(M(1),M(2)), where typically p is a function returning some information about differences between the two files. While an arbitrary collision-intractable hash function does not seem to help in revealing useful information about the nature of the differences between M(1) and M(2), more involved collision-intractable hash functions evolved from conventional ones can be designed to obtain useful information.

In all of the inventive methods described, each file M is composed of n atomic blocks M(1), M(2), ..., M(n), where a block size can be appropriately chosen; for instance, it could be determined as the smallest semantic unit that a file can be decomposed into, e.g., a line in a source file. In one approach, very simple hash function is obtained by returning an atomic hash of each block of the input file and then an atomic hash of all the hashes previously computed, where an atomic hash is computed using any collision-intractable hash function. This technique can be used with the above algorithm DIFF on each block of the file, deriving any interesting information that is required by function p. The obvious drawback however is that the returned hash is too long, as it is equal to n times the size of a conventional hash, which can already be impractical for files of quite small sizes, such as a few kilobytes.

However, in an exemplary embodiment, the size of the returned hash, referred to as the expansion factor of a construction, is defined as follows. Let H be a collision-intractable hash function, and cH be a construction of a hash function which makes calls to H. Then the expansion factor of cH is the size of the output returned by cH on an n-bit input divided by the size of the output returned by H on an n-bit input. Constructions with the shortest possible expansion factor, e.g., logarithmic in n, are most desirable. This enables very small computational and storage overhead resulting from the added verifications and generation of hashes, since all the constructions can be described as a number of applications of hash function equal to the expansion factor.

To achieve this performance, as instantiated on each of the infection techniques, multiple applications of a basic collision-intractable hash function are computed for carefully chosen sequences of the message bits. For example, the choice of the sequences can be performed according to appropriate "encoding schemes" that later allow "decoding" the desired information about the differences between the two messages from the multiple hashes alone, where both the encoding/decoding schemes and the desired information depend on the infection technique.

Another metric of interest will be minimizing the localized area in which the virus is detected. In particular, it is desired to return an interval of blocks containing a number of blocks that is at most max($\rho \cdot b(V),1$), for some localization factor $\rho$, where $b(V)$ is the number of blocks of which virus V is composed.

All of the constructions in the inventive methods achieve localization factor $\rho=2$, expansion factor logarithmic in n, and only require unfrequent, off-line computations of the hashes, so that the computation overhead is not a significant factor towards the efficiency of the overall system.

Figure 2:
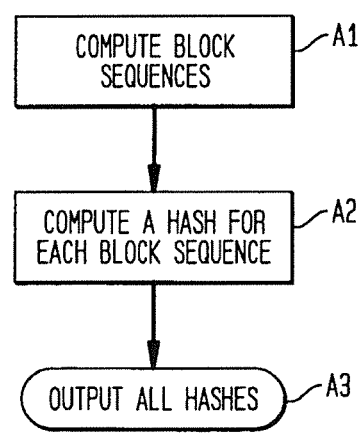
FIG. 2 shows the generic structure of a hashing algorithm computing sequences of file blocks and hashes that are later used to localize a virus.

FIG. 1 is a schematic diagram that illustrates a target file 10 that is modified through a processing technique, so that it becomes a suspect file 12. FIG. 2 shows the generic structure of a hashing algorithm, e.g., a generic p-revealing hash function, computing sequences of file blocks and hashes that are later used to localize a virus. In step A1, the block sequences are computed. In step A2, a hash for each block sequence is computed. The hashes are output in step A3. Hashing algorithms for each type of infection, i.e., rewriting, appending/prepending, and embedding, are described in more detail below.

Virus Localization of Rewriting Infections

Figure 3:
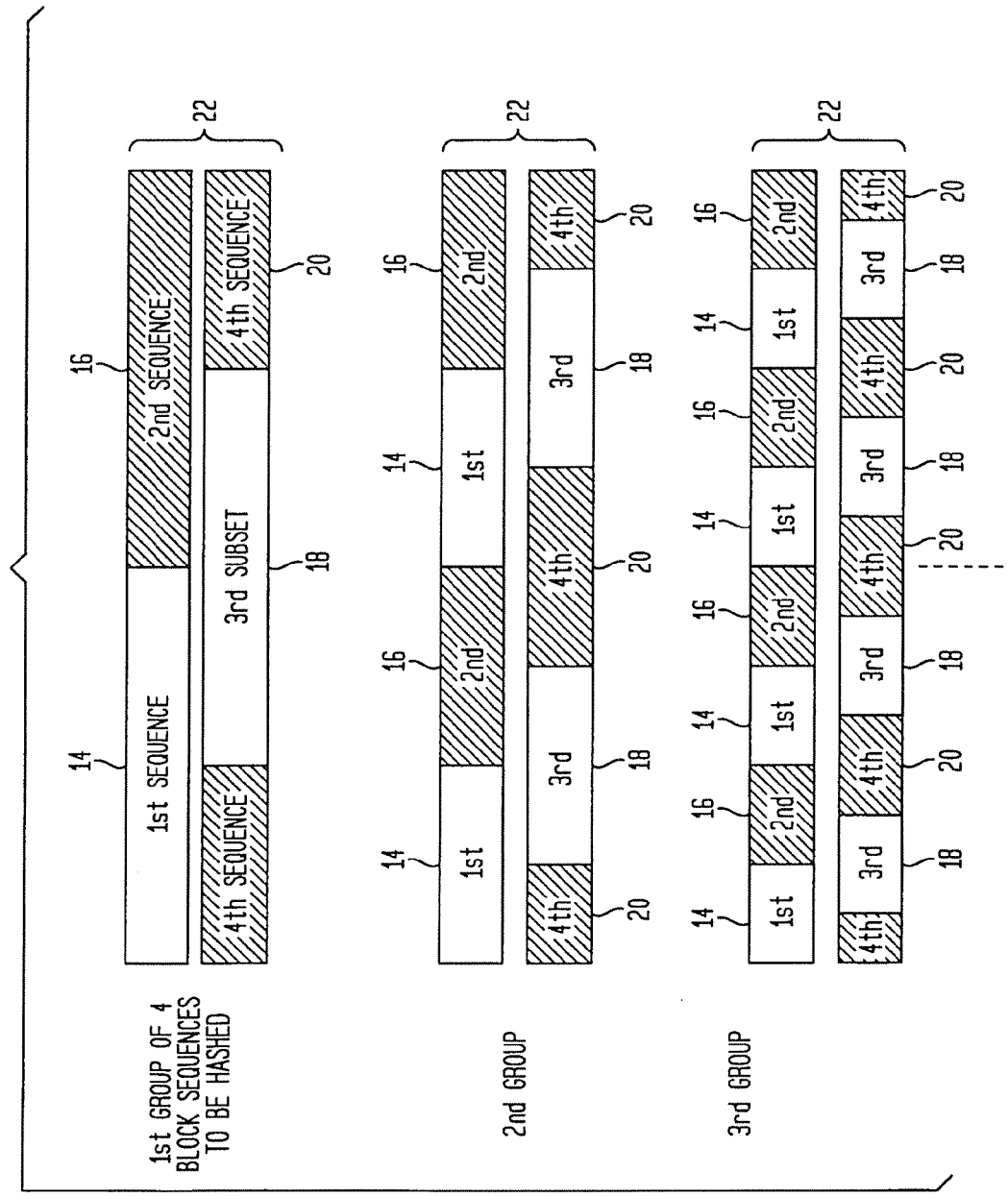
FIG. 3 shows the sequences of file blocks computed by the hashing algorithm Rew-pH in the case of a rewriting virus infected file.

As discussed above, in rewriting infection techniques, a virus rewrites some blocks of a target file. In most instances, the corrupted file remains the same size even after rewriting and the rewritten blocks are adjacently located. The inventive method computes as many hashes of sequences of blocks from the file to be able to later localize a virus rewriting a segment of consecutive blocks anywhere in the file. Hence, assuming the number of blocks in the file is n, then the localizing hash function computes hashes for 4 ($\log_2 n-1$) sequences of file blocks and thus 4 (log n−1) hashes, that is, four hashes for each of the log n−1 groups. For example, when n=1024, 4*(10−1) or 36 hashes are computed. FIG. 3 shows groups 22 made up of sequences of file blocks 14, 16, 18, 20 to be hashed in an exemplary embodiment of virus localization hashing for rewriting infections. Note that in the i-th group 22, the third 18 and fourth 20 sequences are obtained by cyclically rotating the file by $n/2^{i+1}$ blocks and reapplying the division for the first 14 and second 16 sequences.

In an embodiment, the p-revealing collision-resistant hash function, p, is defined as follows. On input of n-block files M1 and M2, function p(M1,M2) is equal to:

0 if M1=M2;

(a,b) if b−a<n/4 and M1(a), M1(a+1), . . . , M1(b) and M2(a), M2(a+1), . . . , M2(b) are the only blocks where M1 and M2 differ;

⊥ otherwise.

Thus the analysis is restricted to viruses rewriting at most n/4 blocks, because when a larger number of blocks is rewritten, the localization problem loses relevance since a localizing hash function is not significantly more useful than a conventional hash function.

Accordingly, at each step, the atomic collision-resistant hash function H is used to compute hashes of some blocks of the input file. Given any two files $M_1$, $M_2$ that differ due to a rewriting virus that modified $M_1$ into $M_2$, the hashes in each step should help in finding the location of the virus by eliminating half of the candidate blocks in $M_2$. The blocks eliminated are one among these four: the first half or the second half of the yet not eliminated blocks in the file, or, the first half or the second half of an appropriate cyclical shift of yet not eliminated blocks in the file. This is enough to achieve localization factor 2, and, since at each step 4 hashes are computed, output expansion is at most 4 log n.

A formal description of the collision-resistant hash function follows. Our p-revealing collision-resistant hash function, which we denote as Rew-pH, takes as input an n-block message M=M(0), . . . , M(n−1), and applies 4 log n times the original collision-resistant hash function H to sequences of the l blocks of M, as follows (we assume for simplicity that n is a power of 2 and logarithms are in base 2):

Step 1:

In this first step, the blocks in M are grouped into 4 sequences, each obtained by concatenating n/2 blocks, defined as:

$$S_{1,1}=M(0)| \ldots |M(n/2-1),$$

$$S_{1,2}=M(n/2)| \ldots |M(n-1),$$

$$S_{1,3}=M(n/4)| \ldots |M(3n/4-1), \text{ and}$$

$$S_{1,4}=M(0)| \ldots |M(n/4-1)|M(3n/4) \ldots |M(n-1))$$

The indices of the blocks in $S_{1,3}$ and $S_{1,4}$ are obtained by cyclically shifting the indices of the blocks in $S_{1,1}$ and $S_{1,2}$, respectively, by n/4. The 4 hashes in this step are computed as $h_{1,i}=H(S_{1,i})$ for i=1, 2, 3, 4.

Step j, for j=2, . . . , log n−1:

Extending step 1, the blocks in M are grouped in $2*2^j$ sequences, each obtained by concatenating $n/2^j$ blocks, defined as:

$$S_{j,i}=M((i-1)*n/2^j)| \ldots |M(i*n/2^j-1) \text{ and}$$

$$S_{j,i+2^j}=M(((i-1)*n/2^j+n/2^{j+1}) \bmod n)| \ldots | M((i*n/2^j+n/2^{j+1}-1) \bmod n),$$

for i=1, . . . , $2^j$. (Note that the indices of the blocks in $S_{j,i+2^j}$ are obtained by cyclically shifting those in $S_{j,i}$ by $n/2^{j+1}$).

The 4 hashes in this step are computed as follows:

when i=1, 2, $$h_{j,i}=H(S_{j,i}|S_{j,i+2}|S_{j,i+4}| \ldots |S_{j,i+2j-2});$$

and, when i=3, 4, $$h_{j,i}=H(S_{j,i-2+2j}|S_{j,i+2j}|S_{j,i+2j+2}| \ldots |S_{j,i+2j+2j-4}).$$

The output of the function is h=(($h_{1,i}$, $h_{2,i}$, . . . , $h_{\log n-1,i}$))$_{i=1,2,3,4}$.

The overall number of atomic hashes of Rew-pH is only 4 log n−4, which is essentially optimal in a model where each hash reveals one bit of information about the location of the virus interval.

To illustrate that Rew-pH is collision-resistant, observe that an algorithm finding collisions in the output of Rew-pH finds two different inputs that are mapped by H to the same h(j|i) for at least one of the values j=0, 1, . . . , log n, and i=1, 2, 3, 4, which implies an algorithm for finding a collision for H.

Figure 4A:
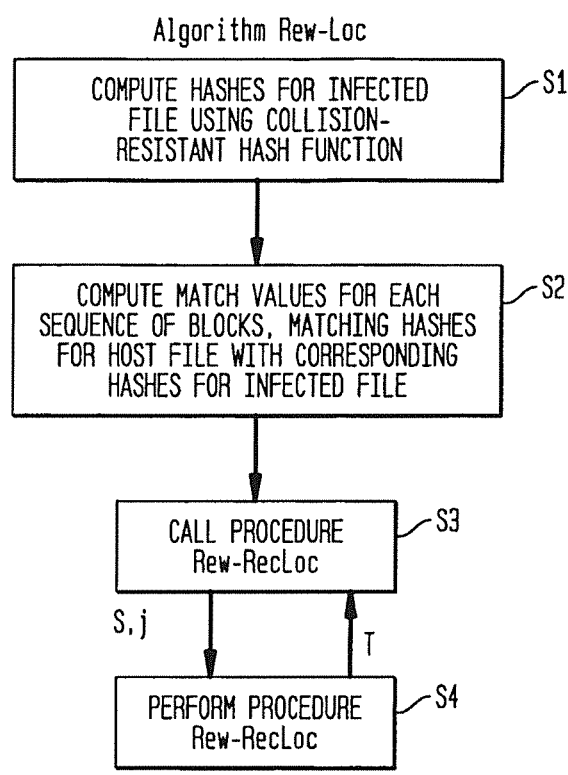
FIG. 4a shows the steps in the rewriting-virus localization algorithm Rew-Loc.

To illustrate that Rew-pH is p-revealing, we construct an efficient algorithm Loc that uses pH and the hashes $h_{j,i}$, for all indices (j,i), j∈{1, . . . , log n−1}, i∈{1, 2, 3, 4}, to localize a rewriting virus in a suspected or possibly corrupted version M' of file M. Algorithm Rew-Loc, shown in FIG. 4A, can be described as follows:

1. compute the output $h'=((h'_{1,i}, h'_{2,i}, \ldots h'_{\log n-1, i}))_{i=1,2,3,4}$, of Rew-pH on input of M' (step S1)
2. compute $t_{j,i}=1$ if $h_{j,i} \neq h'_{j,i}$ or $t_{j,i}=0$ if $h_{j,i}=h'_{j,i}$, for all indices (j,i), j∈{1, . . . , log n−1}, i∈{1, 2, 3, 4} (step S2)
3. set S={1, . . . , n}, j=1 and output the sequence of blocks T returned by procedure Rew-RecLoc (defined below) on input pair (S,j). (step S3)

Step S4 executes procedure Rew-RecLoc.
Procedure Rew-RecLoc(S,j) is defined as follows, and is shown in FIG. 4B:
  1. If $t_{j,i}=1$ for all indices i∈{1, 2, 3, 4} (step S5), then return: T=S and halt.
  2. Let i* be such that $t_{j,i^*}=0$ (step S6)
  3. If i*=1 or 2 (Step S7) then remove from set S all blocks from sets $S_{j,i}, S_{j,i+2}, S_{j,i+4}, \ldots, S_{j,i+2j-2}$ (Step S8)
  4. If i*=3 or 4 (Step S9) then remove from set S all blocks from sets $S_{j,i-2+2j}, S_{j,i+2j}, S_{j,i+2j+2}, \ldots, S_{j,i+2j+2j-4}$ (Step S10).
  5. Run procedure Rew-RecLoc (S,j+1). (Step S11)

Given that, by definition of p, it is enough to only consider the case b−a<n/4, the proof that Rew-pH is p-revealing is a consequence of the following lemma. For any virus interval (a',b') of size at most $n/(2 \cdot 2^j)$, on input of M' (a version of M subject to rewriting infection with the virus interval (a',b')) and the hashes obtained until step j of the construction Rew-pH on input of the original file M, algorithm Rew-Loc returns an interval (a,b) such that a≤a'<b'≤b and, if $n/2^j \geq (b-a+1)$, $(b-a+1) \leq n/2^j$.

Virus Localization of Appending/Prepending Infections

Appending infection techniques and prepending infection techniques can be dealt with in a symmetric way. As discussed above, in appending infection techniques, a virus is appended at the end of the target file 10, while in prepending infection techniques, the virus is added to the front of the target file 10. As a consequence, in both infection techniques, the file size of the resulting corrupted or suspect file 12 increases and, after the virus is appended or prepended, the previous file size may be lost. The inventive method computes many hashes of sequences of blocks from the host file 10 to later localize a virus appending a segment of consecutive blocks at the end of the file (or prepending a segment at the beginning). Assume the number of blocks in the uncorrupted, target file 10 is n, and the number of blocks in the corrupted file 12 is n'. Then, on input of an l-block message, the construction returns at most $\log_{4/3} l/4$ sequences of file blocks and thus at most $\log_{4/3} l/4$ hashes; that is, one hash for each of the $\log_{4/3} l/4$ phases. For example, if l=1024, there are 20 hashes.

Figure 5:
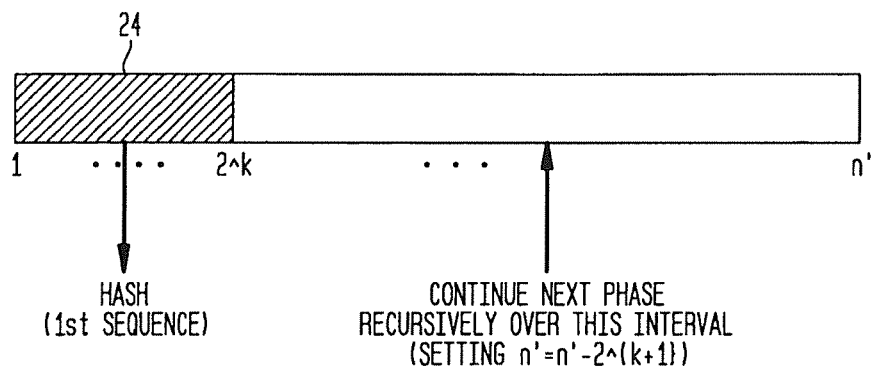
FIG. 5 shows the sequences of file blocks computed by the hashing algorithm App-pH in the case of an appending virus infected file.

FIG. 5 shows sequences of file blocks 24 to be hashed in an exemplary embodiment of virus localization hashing for appending/prepending infections.

For the inventive virus localization method, a p-revealing collision-resistant hash function can be designed, where p is defined as follows. On input of M1 and M2, of not necessarily equal length, function p(M1,M2) is equal to:
  0 if M1=M2;
  x if |M2|≤2|M1| and M1(i)=M2(i) for i=1, . . . , x−1 and M1(i)≠M2(i) for i=x.
  ⊥ otherwise.

As in the case of rewriting infections discussed above, the analysis can be restricted to viruses appending at most n blocks, that is, assume that the number of blocks in M2 is at most 2n, where n is the number of blocks in M1. Accordingly, at each step, the atomic collision-resistant hash function H is used to compute two hashes of some blocks of the input file. Given any two files $M_1$, $M_2$ that differ due to an appending virus that modified $M_1$ into $M_2$, the two hashes in each step should help in finding the location of the virus by eliminating about half of the candidate blocks in $M_2$.

One main difficulty with appending and prepending viruses is that the length of file $M_2$ may be different from the length of target file $M_1$, and, therefore, 'length-dependent' techniques, such as those for the rewriting viruses described above, cannot be used. Instead, starting from the beginning of the file, candidate blocks are eliminated by carefully computing hashes on sequences independent from the length of the target file.

Let H denote a collision-resistant hash function. The p-revealing collision-resistant hash function, which we denote as App-pH, takes as input an l-block message M=M(1), . . . , M(l), . . . , and applies at most log l times the original function H to sequences of the l blocks of M, as follows:
  1. set j←1 and $M_j$=M;
  2. compute the largest positive integer k such that $2^k < l/2$ and obtain, from $M_j$, sequence $S_j = M_j(1), \ldots, M_j(2^k)$, and compute hash $h_j = H(S_j)$;
  3. repeat step 2 recursively over $M_{j+1} = M_j(2^{k+1}+1) | \ldots | M_j(l)$ if $l - 2^{k+1} + 1 \geq 1$ until the new input $M_{j+1}$ has 0 or 1 blocks so that the recursion ends, and set j=j+1;
  4. return all computed hashes $(h_1, h_2, \ldots, h_m)$, for m=$\log_{4/3} l/4$.

If n denotes the number of blocks of the target file M and n' denotes the number of blocks of the corrupted file M', then there are at most log l recursion steps, and therefore the overall number of hashes returned by App-pH is $\leq \log_{4/3} l/4 \leq \log_{4/3} n'/4 \leq \log_{4/3} n-1$, since we assume that n'≤2n. This expansion factor is essentially optimal (up to a multiplicative constant) in a model where each hash reveals one bit of information about the location of the virus interval.

To illustrate that App-pH is collision-resistant, observe that an algorithm finding collisions in the output of App-pH finds two different inputs that are mapped by H to the same h(j|i) for at least one of the values j=1, . . . , log n, and i=1, 2, which implies an algorithm for finding a collision for H.

To illustrate that App-pH is p-revealing, we construct an efficient algorithm App-Loc that uses App-pH and the hashes $h_j$, for all indices j∈{1, . . . , m}, where m=$\log_{4/3} n/4$, to localize an appending virus in a possibly corrupted version M' of file M. Algorithm App-Loc, shown in FIG. 6A, can be described as follows:
  1. set j←1 and $M_j$=M (step S12)
  2. compute the largest positive integer k such that $2^k < n'/2$ and obtain, from $M_j$, the following two block sequences: $S_{j,1} = M_j(1), \ldots, M_j(2^{k-1})$, and $S_{j,2} = M_j(1), \ldots, M_j(2^k)$; and compute hash $h_{1,i} = H(S_{j,i})$ for i=1, 2 (step S13)
  3. repeat step 2 recursively (step S14) over $M_{j+1} = M_j(2^{k+1}+1) | \ldots | M_j(l)$ if $l - 2^{k+1} + 1 \geq 1$ until the new input $M_{j+1}$ has 0 or 1 blocks so that the recursion ends, and set j=j+1 (step S15).
  4. let $(h_1, h_{2,i}, \ldots, h_{m',i})_{i=1,2}$, for m'=$\log_{4/3} n'/4$ denote all computed hashes (step S15).
  5. if m'=m (step S16) then set i=2 (step S17) else set i=1 (step S18)
  6. set $h'=(h'_1, h'_2, \ldots, h'_m)=(h_{1,i}, h_{2,i}, \ldots, h_{m',i})$ (step S19)
  7. compute $t_j=1$ if $h_j \neq h'_j$ or $t_j=0$ if $h_j = h'_j$, for all indices j∈{1, . . . , m'} (step S20)
  8. set S={1, . . . , n}, j=1 and output the pair returned by procedure App-RecLoc (defined below) on input pair (S,j) (step S21).

Figure 6B:
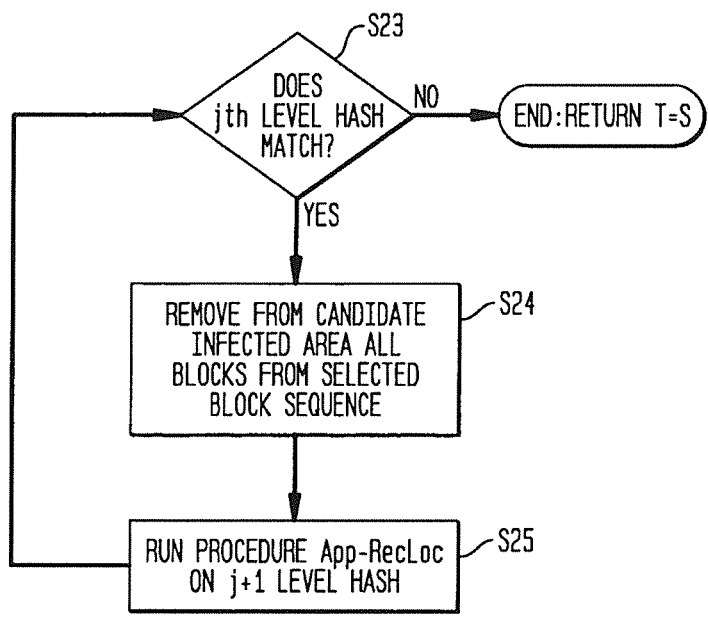
FIG. 6b shows the steps in algorithm App-RecLoc (used by App-Loc)

Step S22 executes procedure App-RecLoc.
Procedure App-RecLoc(S,j) is defined as follows, and is shown in FIG. 6b:
1. If $t_{j,i}=1$ then return: T=S and halt (Step S23).
2. Remove from block sequence S all blocks from block sequence $S_{j,i}$ (Step S24)
3. Run procedure App-RecLoc(S,j+1) (Step S25).

The proof that App-pH is p-revealing is a consequence of the following lemma. For any virus interval (s, l) with at least $l-s_j+1$ blocks, on input of an l-block corrupted file M', equal to the target file M with interval (s, l) appended to it, and the hashes obtained in the first j−1 steps of the recursion in the construction App-pH, algorithm App-Loc returns a value x such that x≤s (that is, the algorithm localizes the virus) and x≥2s−n−1, that is, the localization factor of App-pH is at most 2.

Virus Localization of Embedding Infections

As discussed above, in embedding infection techniques, a virus is inserted somewhere in the middle of the target file 10, and not at the beginning or the end, thus creating a suspect file 12 whose size is larger than the target file 10. The inventive method computes many hashes of sequences of blocks from the target file 10 to later localize a virus embedding a segment of consecutive blocks anywhere in the corrupted file 12. Assume the number of blocks in the target file 10 is n, and the number of blocks in the corrupted file 12 is n'. Then, on input an l-block message, the construction returns at most 8 ($\log_2 l-1$) sequences of file blocks and thus 8 (log l−1) hashes; that is, 8 hashes for each of the log l phases. For example, if n=1024, there are 8*(10−1)=72 hashes.

Figure 7:
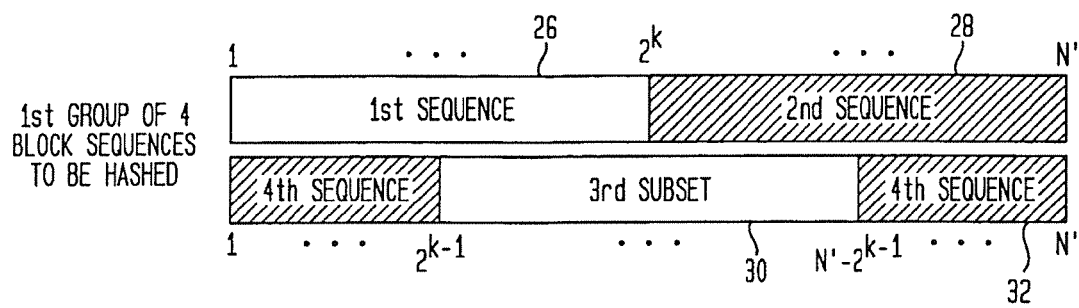
FIG. 7 shows the sequences of file blocks computed by the hashing algorithm Emb-pH in the case of an embedding virus infected file.

FIG. 7 shows subsets of file blocks 26, 28, 30, 32 to be hashed in an exemplary embodiment of virus localization hashing for embedding infections. Because the virus is embedding within the infected or corrupted file 12, it is necessary to find both the beginning and the ending of the virus.

For the inventive virus localization method, a p-revealing collision-resistant hash function can be designed, where p is defined as follows. On input of M1 and M2, of not necessarily equal length, function p(M1,M2) is equal to:
0 if M1=M2;
(a,b) if b−a<n/2 and M1(i)=M2(i) for i=1, . . . , a−1, and M1($i_1$)=M2($i_2$) for $i_1$=b+1, . . . , n, and $i_2=i_1+b−1+1$.
⊥ otherwise.

The analysis is restricted to viruses embedding at most n blocks, that is, the number of blocks in M2 is assumed to be at most 2n, where n is the number of blocks in the target file M1.

A construction of a p-revealing hash function for the case of embedding infections is a combination of the constructions for the cases of rewriting and appending infections. The combination consists of employing this technique using 'length-independent' sequences of file blocks, as in the construction for appending infections, using the sequence structure as in the construction for rewriting infections. The resulting construction has localization factor 2 and expansion factor 8 log l, where l is the size of the input file.

A formal description of the function follows. Let H denote a collision-resistant hash function. Our p-revealing collision-resistant hash function, which we denote as Emb-pH, takes as input an n-block message M=M(0), . . . , M(l−1), and applies 8 (log l−1) times the original function H to sequences of the l blocks of M, by running the following steps once on input M=M(0), . . . , M(l−1), and once on input the reverse file rM=M(l−1), . . . , M(0) (we assume for simplicity that l is a power of 2 and logarithms are in base 2):
Step 1:
Compute the largest positive integer k such that $2^k<l/2$. In this first step, the blocks in M are grouped into 4 sequences, each obtained by concatenating l/2 blocks, defined as:

$S_{1,1}=M(0)| \ldots |M(2^k-1)$, $S_{1,2}=M(2^k)| \ldots |M(l-1)$, $S_{1,3}=M(2^{k-1})| \ldots |M(l-1-2^{k-1})$, and $S_{1,4}=M(0)| \ldots |M(2^{k-1}-1)|M(l-1-2^{k-1})| \ldots |M(n-1))$ The indices of the blocks in $S_{1,3}$ and $S_{1,4}$ are obtained by cyclically shifting the indices of the blocks in $S_{1,1}$ and $S_{1,2}$, respectively, by $2^{k-1}$. The 4 hashes in this step are computed as $h_{1,i}=H(S_{1,i})$ for i=1, 2, 3, 4.

Step j, for j=2, . . . , log l−1:
Extending step 1, the blocks in M are grouped in $2*2^j$ sequences, each obtained by concatenating $n/2^j$ blocks, defined as:
$S_{j,i}=M((c-1)*2^k/2^j)| \ldots |M(c*2^k/2^j-1)|M(2^k+(d-1)*(1-2^k)/2^j)| \ldots |M(2^k+d*l/2^j-1))$, for c,d=1, . . . , $2^j$, and $S_{j,i+2j}$ which is similarly defined, except that the indices of its blocks are obtained by cyclically shifting those in $S_{j,i}$ by $2^k/2^j$.

The 4 hashes in this step are computed as follows:
when i=1, 2, $h_{j,i}=H(S_{j,i}|S_{j,i+2}|S_{j,i+4}| \ldots |S_{j,i+2j-2})$;

and, when i=3, 4, $h_{j,i}=H(S_{j,i-2+2j}|S_{j,i+2j}+2| \ldots |S_{j,i+2j+2j-4})$.

The output of the function is h=(($h_{1,i}$, $h_{2,i}$, . . . , $h_{\log n-1,i}$))$_{i=1,2,3,4,5,6,7,8}$ (here the $h_{j,i}$ for i=1, 2, 3, 4, refer to M and the $h_{j,i}$ for i=5, 6, 7, 8, refer to rM).

The overall number of atomic hashes of Emb-pH is only 8 log n−8, which is essentially optimal in a model where each hash reveals one bit of information about the location of the virus interval.

Figure 8:
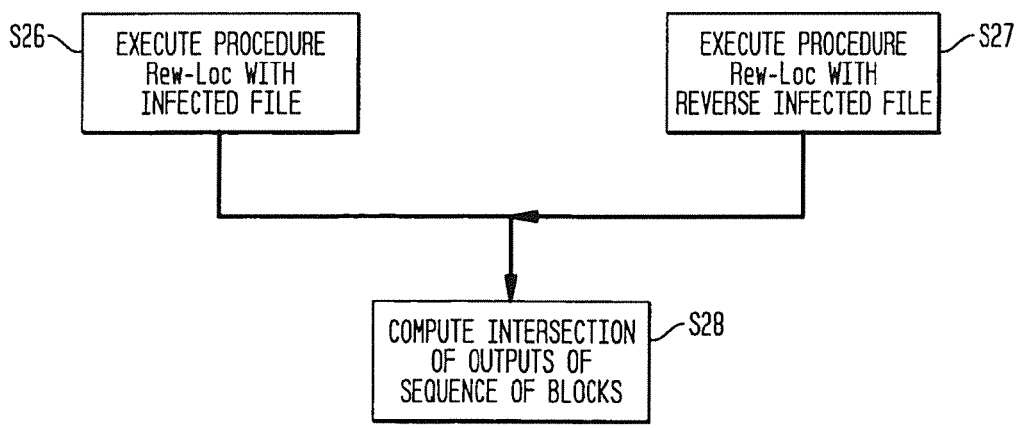
FIG. 8 shows the steps in the embedding-virus localization algorithm Emb-Loc.
Figure 5:
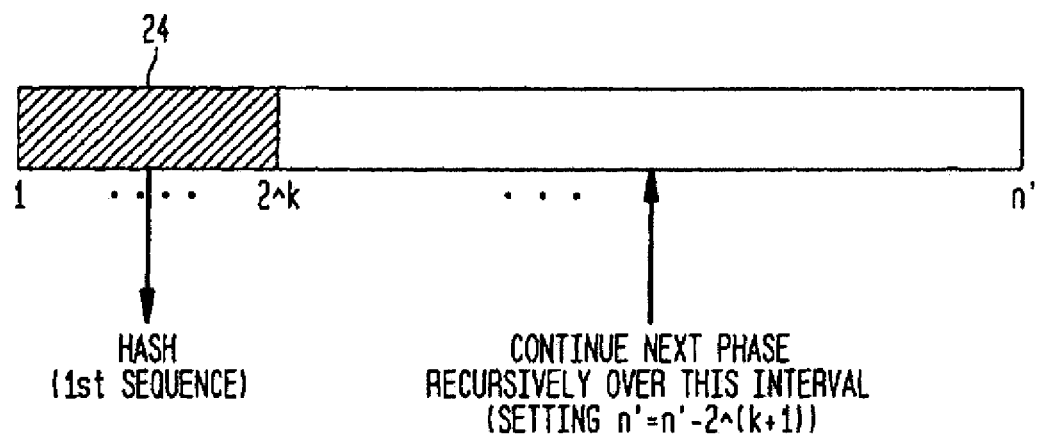

Similarly to previously constructed hash functions, we can see that Emb-pH is collision-resistant. To illustrate that Emb-pH is p-revealing, we construct an efficient algorithm Emb-Loc (shown in FIG. 8) that uses Emb-pH and the hashes $h_{j,i}$, for all indices (j,i), j, ∈{1, . . . , log n−1}, i∈{1, . . . , 8}, to localize an embedding virus in a possibly corrupted version M' of file M. This algorithm consists of running the algorithm Rew-Loc twice: once using file M and the hashes $h_{j,i}$, for all indices (j,i), j∈{1, . . . , log n−1}, i∈{1, . . . , 4}, (step S26) and once using file rM and the hashes $h_{j,i}$, for all indices (j,i), j∈{1, . . . , log n−1}, i∈{5, . . . , 8} (step S27). Let S1 and S2 be the outputs thus obtained. Algorithm Emb-Loc returns the intersection of sets S1 and S2 (step S28).

Performance Analysis

A summary of the applicability and performance of the inventive techniques described above, when compared with two known techniques, is presented and depicted in FIGS. 9 and 10.

As discussed above, "detection construction" denotes the construction that only computes a single hash of its entire input file, and "trivial construction" denotes the construction that computes a single hash of each block of the input file. Recall that the constructions in the Virus Localization of Rewriting Infections section, the Virus Localization of Appending/Prepending Infections section, and the Virus Localization of Embedding Infections section are denoted as Rew-pH, App-pH, Emb-pH, respectively, and n is the number of blocks in the file. While the detection and the trivial constructions are applicable to any infection technique in the characterization given above, each of the three hash function constructions Rew-pH, App-pH, Emb-pH was tailored for a specific infection technique.

Additionally, the restrictions on the virus length in these constructions Rew-pH, App-pH, Emb-pH is essentially without loss of generality, as the virus localization problem loses significance whenever such restrictions are not satisfied.

FIG. 10 summarizes the following performance factors. With respect to the localizing factor, the detection construction practically does no localization, while the trivial construction has the best possible localization as it localizes all infected blocks. The constructions Rew-pH, App-pH, Emb-pH localize an area only at most twice as large as the infected area. With respect to the expansion factor, the trivial construction has a too large expansion, while the detection construction has practically no expansion and the constructions Rew-pH, App-pH, Emb-pH only have a logarithmic (in n) expansion of the hash.

Finally, with respect to the time performance, the trivial and detection construction have essentially no time blowup with respect to a single hash computation, and constructions Rew-pH, App-pH, Emb-pH only compute a logarithmic (in n) number of hashes.

While the present invention has been described in particular embodiments, it should be appreciated that the present invention should not be construed as limited by such embodiments, but rather construed according to the below claims.

What is claimed is:

1. A method for virus localization, the method comprising:
calculating first hashes for a first sequence of file blocks from at least a section of a host file;
calculating second hashes for a second sequence of file blocks from a modified host file, the second sequence corresponding to the first sequence;
comparing the first hashes and the second hashes to determine first matching data;
calculating third hashes for a third sequence of file blocks from a reverse of the at least a section of the host file;
calculating fourth hashes for a fourth sequence of file blocks from a reverse of the at least a section of the modified host file, the fourth sequence corresponding to the third sequence;
comparing the third hashes and the fourth hashes to determine second matching data; and
outputting an estimated location of a virus relative to the modified host file based upon an intersection of the first and second matching data using a processor circuit.

2. The method of claim 1 wherein the calculating the first hashes for the first sequence of file blocks from the host file comprises solving for an exponential component in a sequencing formula based at least in part on a number of file blocks in the host file.

3. The method of claim 1 wherein the calculating the first hashes for the first sequence of file blocks from the host file comprises defining sequences of file blocks as cyclically shifted portions of the file blocks of the at least a section of the host file.

4. The method of claim 1 wherein the outputting the estimated location of the virus relative to the modified host file comprises outputting a range of file blocks including file blocks wherein the first and second hashes and the third and fourth hashes do not match.

5. The method of claim 1 wherein the outputting the estimated location of the virus relative to the modified host file comprises outputting a sequence subset of the corresponding sequences for the modified host file wherein the second and fourth hashes for the sequence subset do not match the corresponding first and third hashes.

6. The method of claim 1, wherein calculating the first hashes and calculating the third hashes are performed using one of a collision-resistant hash function, a digital signature scheme, a message authentication code, or a pseudo-random function.

7. The method of claim 1, wherein the outputting the estimated location of the virus comprises outputting a sequence of file blocks not larger than the virus by more than a predetermined multiplicative factor.

8. A non-transitory tangible computer-readable medium storing instructions such that, if executed by a machine, will cause the machine to execute operations comprising:
calculating first hashes for a first sequences of file blocks from at least a section of a host file;
calculating second hashes for a second sequence of file blocks from a modified host file, the second sequence corresponding to the first sequence;
comparing the first hashes and the second hashes to determine first matching data;
calculating third hashes for a third sequence of file blocks from a reverse of the at least a section of the host file;
calculating fourth hashes for a fourth sequence of file blocks from a reverse of the at least a section of the modified host file;
comparing the third hashes and the fourth hashes to determine second matching data; and
outputting an estimated location of a virus relative to the modified host file based upon based upon an intersection of the first and second matching data.

9. The non-transitory tangible computer-readable medium of claim 8 storing further instruction such that, if executed by a machine, will cause the machine to execute determining the first sequence of file blocks from the host file comprising solving for an exponential component in a sequencing formula based at least in part on a number of file blocks in the host file.

10. The non-transitory tangible computer-readable medium of claim 8 storing further instruction such that, if executed by a machine, will cause the machine to execute determining the first sequence of file blocks from the host file comprising defining sequences of file blocks as shifted portions of the file blocks of the at least a section of the host file.

11. The non-transitory tangible computer-readable medium of claim 8 storing further instruction such that, if executed by a machine, will cause the machine to execute outputting a sequence subset of the corresponding second and fourth sequences for the modified host file wherein the second and fourth hashes for the sequence subset do not match the corresponding first and third hashes.

12. The non-transitory tangible computer-readable medium of claim 8 storing further instruction such that, if executed by a machine, will cause the machine to execute outputting the estimated location of the virus relative to the modified host file including outputting a range of file blocks including file blocks wherein the first and second hashes and the third and fourth hashes do not match.

13. The non-transitory tangible computer-readable medium of claim 8 storing further instruction such that, if executed by a machine, will cause the machine to execute calculating the first hashes and calculating the third hashes including using one of a collision-resistant hash function, a digital signature scheme, a message authentication code, or a pseudo-random function.

14. An apparatus configured to detect and locate a computer virus in a modified file, the apparatus comprising:
a memory configured to receive and store a modified file and a set of first and third hashes which correspond to a processing result of a host file;

at least one processing circuit of a computer device, the processing circuit in communication with the memory, the processing circuit configured to calculate second and fourth hashes for at least a section of the modified file using corresponding second and fourth sequences of file blocks as used to calculate the first and third hashes, the first hashes calculated for a first sequence of file blocks from at least a section of the host file and the third hashes calculated for a third sequence of file blocks from a reverse of the at least a section of the host file;

wherein the at least one processing circuit is configured to compare the first hashes and the second hashes to determine first matching data, compare the third hashes and the fourth hashes to determine second matching data, and to output an estimated location of a virus relative to the modified file based upon an intersection of the first and second matching data.

15. The apparatus of claim 14 wherein the at least one processing circuit is configured to calculate the second hashes for the modified file by solving for an exponential component in a sequencing formula based at least in part on a number of file blocks in the modified file.

16. The apparatus of claim 14 wherein the at least one processing circuit is configured to calculate the second hashes for the modified file by defining sequences of file blocks as cyclically shifted portions of the file blocks of the at least a section of the modified file.

17. The apparatus of claim 14 wherein the at least one processing circuit is configured to output the estimated location of the virus relative to the modified file by outputting a sequence subset of the corresponding second and fourth sequences for the modified file wherein the hashes for the sequence subset do not match the corresponding first and third hashes.

18. The apparatus of claim 14 wherein the at least one processing circuit is configured to output the estimated location of the virus relative to the modified file comprising outputting a range of file blocks wherein the first and second hashes and third and fourth hashes do not match.

* * * * *

UNITED STATES PATENT AND TRADEMARK OFFICE
CERTIFICATE OF CORRECTION

PATENT NO.        : 8,572,743 B2
APPLICATION NO.   : 13/408728
DATED             : October 29, 2013
INVENTOR(S)       : Di Crescenzo et al.

It is certified that error appears in the above-identified patent and that said Letters Patent is hereby corrected as shown below:

In the Drawings

In Fig. 5, Sheet 5 of 9, delete "POSITIVE INTERGER" and insert -- POSITIVE INTEGER --, therefor. (as shown on attached drawing sheet)

In Fig. 5, Sheet 5 of 9, delete "n'-2^(k+1})" and insert -- n'-2^(k+1)) --, therefor. (as shown on attached drawing sheet)

In the Specifications

In Column 5, Line 56, delete "file f," and insert -- file f', --, therefor.

In Column 8, Line 26, delete "$S_{1,4}=M(0)|\ldots|M(n/4-1)|M(3n/4)\ldots|M(n-1))$ ," and insert -- $S_{1,4}=M(0)|\ldots|M(n/4-1)|M(3n/4)\ldots|M(n-1)$ --, therefor.

In Column 8, Lines 50-51, delete "$h=((h_{1,i},h_{2,i},\ldots,h_{\log n-1,i}))\ i=1,2,3,4\cdot$ ," and insert -- $h=(h_{1,i},h_{2,i},\ldots,h_{\log n-1,i})\ i=1,2,3,4\cdot$ --, therefor.

In Column 9, Line 1, delete "$h'=((h'_{1,i},h'_{2,i},\ldots,h'_{\log n-1,i}))\ i=1,2,3,4,$" and insert -- $h'=(h'_{1,i},h'_{2,i},\ldots,h'_{\log n-1,i})\ i=1,2,3,4,$ --, therefor.

In Column 9, Line 3, delete "$t_{i,j}=$" and insert -- $t_{j,i}=$ --, therefor.

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,572,743 B2

In Column 10, Line 61, delete "($h'_1$, $h'_2$,......,$h'_m$)" and insert -- ($h'_1$, $h'_2$,......,$h'_{m'}$) --, therefor.

In Column 11, Line 66, delete "Mare" and insert -- M are --, therefor.

In Column 12, Line 7, delete " $S_{l,4}=M(0)|\ldots |M(2^{k-1}-1)|M(\ell-1-2^{k-1})|\ldots |M(n-1))$ " and insert -- $S_{l,4}=M(0)|\ldots |M(2^{k-1}-1)|M(\ell-1-2^{k-1})|\ldots |M(n-1)$ --, therefor.

In Column 12, Line 17, delete "$|M(2^k+d*1/2^j-1))$," and insert -- $|M(2^k+d*1/2^j-1)$, --, therefor.

In Column 12, Lines 27-28,
delete " $h=((h_{1,i}, h_{2,i}, \ldots, h_{\log n-1, i})) \; i=1,2,3,4,5,6,7,8$ " and insert -- $h=(h_{1,i}, h_{2,i}, \ldots, h_{\log n-1, i}) \; i=1,2,3,4,5,6,7,8$ --, therefor.

In the Claims

In Column 14, Line 27, in Claim 8, delete "based upon based upon" and insert -- based upon --, therefor.